United States Patent
Delker et al.

(10) Patent No.: US 9,357,378 B1
(45) Date of Patent: May 31, 2016

(54) SUBSCRIBER IDENTITY MODULE (SIM) CARD INITIATION OF CUSTOM APPLICATION LAUNCHER INSTALLATION ON A MOBILE COMMUNICATION DEVICE

(71) Applicant: Sprint Communications Company L.P., Overland Park, KS (US)

(72) Inventors: Jason R. Delker, Olathe, KS (US); Drew T. Dennis, Kansas City, MO (US); Cynthia Fung, Kansas City, MO (US); M. Jeffrey Stone, Overland Park, KS (US); Shannon L. Stone, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/639,056

(22) Filed: Mar. 4, 2015

(51) Int. Cl.
*H04W 8/22* (2009.01)

(52) U.S. Cl.
CPC ...................... *H04W 8/22* (2013.01)

(58) Field of Classification Search
CPC ...................................... H04W 8/22
USPC .............................. 455/419, 414.1
See application file for complete search history.

(56) References Cited

U.S. PATENT DOCUMENTS

| | | | |
|---|---|---|---|
| 6,131,024 A | 10/2000 | Boltz | |
| 6,441,831 B1 | 8/2002 | Abramowitz et al. | |
| 6,445,914 B1 | 9/2002 | Findikli et al. | |
| 6,753,887 B2 | 6/2004 | Carolan et al. | |
| 6,882,290 B2 | 4/2005 | French et al. | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,409,208 B1 | 8/2008 | Clare et al. | |
| 7,493,111 B2 | 2/2009 | Knowles | |
| 7,552,432 B2 | 6/2009 | Aiba | |
| 7,681,134 B1 | 3/2010 | Grechishkin et al. | |
| 7,788,593 B1 | 8/2010 | Grechishkin et al. | |
| 7,817,988 B2 | 10/2010 | Kruis et al. | |
| 7,904,895 B1 | 3/2011 | Cassapakis et al. | |

(Continued)

FOREIGN PATENT DOCUMENTS

| GB | 2292047 A | 2/1996 |
|---|---|---|
| KR | 2006039974 A | 5/2006 |

(Continued)

OTHER PUBLICATIONS

FAIPP Pre-Interview Communication dated Aug. 25, 2014, U.S. Appl. No. 13/940,251, filed Jul. 11, 2013.

(Continued)

*Primary Examiner* — Nathan Taylor

(57) ABSTRACT

A subscriber identity module (SIM) card. The SIM card comprises a processor, a memory, and an operation object. The memory stores, in part, the operation object, an integrated circuit card identifier (ICCID), an international mobile subscriber identity (IMSI), and an authentication key. When executed by the processor, the operation object causes a browser to be executed on a mobile communication device into which the SIM card is installed, provides a uniform resource locator (URL) to the browser, wherein the URL identifies a Web site, and causes the browser to send a request to the URL to download a custom application launcher and to install the custom application launcher on the mobile communication device.

18 Claims, 8 Drawing Sheets

(56) References Cited

U.S. PATENT DOCUMENTS

| | | |
|---|---|---|
| 7,991,988 B2 | 8/2011 | Chen |
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,468,164 B1 | 6/2013 | Paleja et al. |
| 8,571,536 B2 | 10/2013 | Urbanek |
| 8,577,737 B1 | 11/2013 | Amacker et al. |
| 8,612,967 B1 | 12/2013 | Delker |
| 8,626,165 B1 | 1/2014 | Narasimhan et al. |
| 8,650,096 B2 | 2/2014 | Van Buskirk et al. |
| 8,666,383 B1 | 3/2014 | Mauer et al. |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,291 B1 | 12/2014 | Spanel et al. |
| 8,938,436 B2 | 1/2015 | Kozempel |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,092,291 B1 | 7/2015 | Adib et al. |
| 9,098,366 B1 | 8/2015 | Adib et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,307,400 B1 | 4/2016 | Blinn et al. |
| 2002/0091931 A1 | 7/2002 | Quick, Jr. et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0148598 A1 | 7/2004 | Kita et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0121894 A1 | 6/2006 | Ganesan |
| 2006/0135144 A1 | 6/2006 | Jothipragasam |
| 2006/0154651 A1 | 7/2006 | Knowles |
| 2006/0168340 A1 | 7/2006 | Heller et al. |
| 2006/0203722 A1 | 9/2006 | Oommen |
| 2006/0208071 A1 | 9/2006 | Chang et al. |
| 2006/0235760 A1 | 10/2006 | Sanjar et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1* | 1/2007 | Wang .............. G06F 9/4448 455/558 |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1* | 6/2007 | U. Tenhunen ............ G06F 8/60 |
| 2007/0143740 A1 | 6/2007 | Hoerentrup et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1* | 7/2008 | Srinivas Reddy .. G06Q 30/0603 455/414.1 |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0064055 A1 | 3/2009 | Chaudhri et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0199176 A1 | 8/2009 | Nath et al. |
| 2009/0239518 A1 | 9/2009 | Feuillette |
| 2009/0247124 A1 | 10/2009 | de Atley et al. |
| 2009/0259974 A1* | 10/2009 | Lin ................... H04M 1/72583 715/840 |
| 2009/0260004 A1 | 10/2009 | Datta et al. |
| 2009/0288079 A1 | 11/2009 | Zuber et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0262638 A1 | 10/2010 | Fitzgerald |
| 2010/0269107 A1 | 10/2010 | Jung et al. |
| 2010/0291108 A1 | 11/2010 | Sanding et al. |
| 2010/0311404 A1 | 12/2010 | Shi et al. |
| 2010/0311468 A1* | 12/2010 | Shi ........................ H04W 4/003 455/558 |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0034160 A1 | 2/2011 | Corda et al. |

(56) References Cited

U.S. PATENT DOCUMENTS

| | | |
|---|---|---|
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0054002 A1 | 3/2012 | Rotbard et al. |
| 2012/0072311 A1 | 3/2012 | Khan |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0272178 A1 | 10/2012 | Oygard et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0298320 A1 | 10/2014 | Xu et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0065105 A1 | 3/2015 | Masterson et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0304506 A1* | 10/2015 | Zhu ................. H04M 15/49 455/406 |
| 2015/0331590 A1 | 11/2015 | Yasui |
| 2015/0370428 A1 | 12/2015 | Chan et al. |
| 2016/0094931 A1 | 3/2016 | Urbanek |

FOREIGN PATENT DOCUMENTS

| | | |
|---|---|---|
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 10/2014 |
| WO | WO2015030945 A1 | 3/2015 |
| WO | WO2015060965 A2 | 4/2015 |

OTHER PUBLICATIONS

First Action Interview Office Action dated Oct. 17, 2014, U.S. Appl. No. 13/940,251, filed Jul. 11, 2013.

Notice of Allowance dated Mar. 9, 2015, U.S. Appl. No. 13/940,251, filed Jul. 11, 2013.

FAIPP Pre-Interview Communication dated Aug. 25, 2014, U.S. Appl. No. 13/940,253, filed Jul. 11, 2013.

First Action Interview Office Action dated Oct. 17, 2014, U.S. Appl. No. 13/940,253, filed Jul. 11, 2013.

Notice of Allowance dated Mar. 6, 2015, U.S. Appl. No. 13/940,253, filed Jul. 11, 2013.

FAIPP Pre-Interview Communication dated Jul. 24, 2015, U.S. Appl. No. 14/168,007, filed Jan. 30, 2014.

Mehrotra, et al., "SenSocial: a Middleware for Integrating Online Social Networks and Mobile Sensing Data Streams," ACM, Middleware '14, Dec. 8-12, 2014, Bordeaux, France.

Fultz, David K., et al., "Virtual Preloads," filed Jan. 30, 2014, U.S. Appl. No. 14/168,007.

Schwermann, Nathan M., et al., entitled, "Methods for Customization of Default Applications on a Mobile Communication Device," filed Apr. 30, 2015, U.S. Appl. No. 14/701,156.

Foreign Office Action dated Jul. 7, 2015, Japanese Application Serial No. 2013-543310, filed Jul. 7, 2015.

Notice of Allowance dated Aug. 6, 2015, U.S. Appl. No. 14/152,627, filed Jan. 10, 2013.

Notice of Allowance dated Jul. 15, 2015, U.S. Appl. No. 13/622,234, filed Sep. 18, 2012.

Notice of Allowance dated Jul. 16, 2015, U.S. Appl. No. 13/844,104, filed Mar. 15, 2013.

Final Office Action dated Aug. 10, 2015, U.S. Appl. No. 13/763,443, filed Feb. 8, 2013.

FAIPP Pre-Interview Communication dated Sep. 29, 2015, U.S. Appl. No. 14/163,035, filed Jan. 24, 2014.

FAIPP Pre-Interview Communication dated Aug. 20, 2015, U.S. Appl. No. 14/073,321, filed Nov. 6, 2013.

FAIPP Pre-Interview Communication dated Jul. 15, 2015, U.S. Appl. No. 14/163,041, filed Jan. 24, 2014.

FAIPP Pre-Interview Communication dated Sep. 21, 2015, U.S. Appl. No. 14/231,718, filed Mar. 31, 2014.

Foreign Communication From a Related Counterpart Application, International Preliminary Report on Patentability dated Jul. 30, 2015, PCT/US13/68981, filed on Nov. 7, 2013.

Foreign Communication From a Related Counterpart Application, International Preliminary Report on Patentability dated Aug. 20, 2015, PCT/US14/13936, filed on Jan. 30, 2014.

(56) References Cited

OTHER PUBLICATIONS

Foreign Communication From a Related Counterpart Application, International Preliminary Report on Patentability Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Urbanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
Ghoshal, Jagannath, et al., "Dynamic Subscriber Identity Module," filed Feb. 11, 2015, U.S. Appl. No. 14/619,677.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736, filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication from a Related Counterpart—International Preliminary Report on Patentability, dated Apr. 2, 2015, PCT/US13/55023, filed on Aug. 15, 2013.
Foreign Communication From a Related Counterpart Application, International Search Report and Written Opinion dated Jan. 24, 2014, PCT/US13/68981, filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Foreign Communication from a Related Counterpart—International Search Report and Written Opinion, dated Jun. 3, 2014, PCT/US14/16650, filed on Feb. 16, 2014.
Foreign Communication from a Related Counterpart Application, "Preliminary Report on Patentability," dated Nov. 20, 2014, PCT/US13/40278, filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed on Sep. 22, 2014.
Delker, Jason R., "Loading Branded Media Outside System Partition," filed Oct. 30, 2013, U.S. Appl. No. 14/066,947.
Mauer, Brian D., et al., "Automatic Branding of Generic Applications," filed Jan. 10, 2013, U.S. Appl. No. 14/152,627.
Spanel, Robert L., et al., "Dynamic Remotely Managed SIM Profile," U.S. Appl. No. 14/522,586, filed Oct. 24, 2014.
Annan, Brandon C., et al., "System and Method of Branding and Labeling a Mobile Device," filed Mar. 15, 2013, U.S. Appl. No. 13/844,104.
Annan, Brandon C., et al., "Electronic Fixed Brand Labeling," filed Feb. 8, 2013, U.S. Appl. No. 13/763,443.
Ghoshal, Jagannath, et al., "Rebranding a Portable Electronic Device While Maintaining User Data," filed May 22, 2013, U.S. Appl. No. 13/899,567.
Ghoshal, Jagannath, et al., "System and Method for Retrofitting a Branding Framework into a Mobile Communication Device," filed May 21, 2013, U.S. Appl. No. 13/899,566.
Urbanek, Robert E., "Delivery of Branding Content and Customizations to a Mobile Communication Device," filed Oct. 23, 2013, U.S. Appl. No. 14/060,712.
Urbanek, Robert E., "Delivery of Branding Content and Customizations to a Mobile Communication Device," filed Sep. 22, 2014, International Serial No. PCT/US14/56778.
Urbanek, Robert E., "Implementation of Remotely Hosted Branding Content and Customizations," filed Oct. 23, 2013, U.S. Appl. No. 14/085,474.

(56) References Cited

OTHER PUBLICATIONS

Urbanek, Robert E., "Subscriber Identity Module Virtualization," filed Nov. 20, 2013, U.S. Appl. No. 14/060,719.
Indurkar, Dhananjay, "System and Method of Branding a Device Independent of Device Activation," filed Jan. 24, 2014, U.S. Appl. No. 14/163,035.
Sumner, Bret D., "Directing Server Connection Based on Location Identifier," filed Aug. 15, 2013, U.S. Appl. No. 13/968,259.
Abou-El-Ella, Hassan, et al., "Segmented Customization Payload Delivery," filed Aug. 27, 2013, U.S. Appl. No. 14/010,518.
Sumner, Bret D., "Segmented Customization Package Within Distributed Server Architecture," filed Aug. 27, 2013, U.S. Appl. No. 14/010,522.
Masterson, Michelle E., et al., "Development and Testing of Payload Receipt by a Portable Electronic Device," filed Aug. 27, 2013, U.S. Appl. No. 14/010,523.
Callan, Jeffery S., et al., "Delivery of Oversized Branding Elements for Customization," filed Nov. 6, 2013, U.S. Appl. No. 14/073,321.
Indurkar, Dhananjay, "Background Delivery of Device Configuration and Branding," filed Jan. 16, 2014, U.S. Appl. No. 14/157,507.
Ahn, Chul Jin, et al., "Separation of Client Identification Composition from Customization Payload to Original Equipment Manufacturer Layer," filed Nov. 8, 2013, U.S. Appl. No. 14/075,687.
Ghoshal, Jagannath, et al., "Multiple Carrier Partition Dynamic Access on a Mobile Device," filed Jun. 5, 2014, U.S. Appl. No. 14/297,429.
Indurkar, Dhananjay, "Activation Sequence Using Permission Based Connection to Network," filed Jan. 24, 2014, U.S. Appl. No. 14/163,041.
Ahn, Chul Jin, et al., "Customization for Preloaded Applications," filed Mar. 31, 2014, U.S. Appl. No. 14/231,718.
Koller, Gary D., et al., "Out of the Box Experience (OOBE) Country Choicwe Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
FAIPP Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
FAIPP Pre-Interview Communication dated Sep. 22, 2014, U.S. Appl. No. 13/468,028, filed May 9, 2013.
First Action Interview Office Action dated Mar. 16, 2015, U.S. Appl. No. 13/468,028, filed May 9, 2013.
FAIPP Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
FAIPP Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
Office Action dated Mar. 2, 2015, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Mar. 26, 2015, U.S. Appl. No. 14/522,586, filed Oct. 24, 2014.
FAIPP Pre-Interview Communication dated Jul. 16, 2014, U.S. Appl. No. 13/744,861, filed Jan. 18, 2013.
Notice of Allowance dated Nov. 20, 2014, U.S. Appl. No. 13/744,861, filed Jan. 18, 2013.
FAIPP Pre-Interview Communication dated Apr. 8, 2015, U.S. Appl. No. 13/844,104, filed Mar. 15, 2013.
FAIPP Pre-Interview Communication dated Oct. 22, 2014, U.S. Appl. No. 13/763,428, filed Feb. 8, 2013.
Notice of Allowance dated Mar. 20, 2015, U.S. Appl. No. 13/763,428, filed Feb. 8, 2013.
FAIPP Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Notice of Allowance dated Mar. 26, 2015, U.S. Appl. No. 13/763,434, filed Feb. 8, 2013.
Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 14, 2013.
FAIPP Pre-Interview Communication dated Nov. 20, 2014, U.S. Appl. No. 13/899,566, filed May 21, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Office Action dated Oct. 1, 2015, U.S. Appl. No. 14/701,156, filed Apr. 30, 2015.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.

(56) References Cited

OTHER PUBLICATIONS

Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed Jul. 16, 2014.
Foreign Communication from a Related Counterpart—International Search Report and Written Opinion, dated Apr. 4, 2016, PCT/US16/13272, filed Jan. 13, 2016.
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.
Final Office Action dated Jan. 28, 2016, U.S. Appl. No. 14/168,007, filed Jan. 30, 2014.
Advisory Action dated Mar. 29, 2016, U.S. Appl. No. 14/168,007, filed Jan. 30, 2014.
Final Office Action dated Feb. 8, 2016, U.S. Appl. No. 14/701,156, filed Apr. 30, 2015.

* cited by examiner

SUBSCRIBER IDENTITY MODULE (SIM) CARD INITIATION OF CUSTOM APPLICATION LAUNCHER INSTALLATION ON A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An application launcher presents the main display view of a mobile communication device (e.g., the presentation of controls and icons on the color graphics display of a smart phone) and is responsible for starting applications and hosting live widgets. Typically application launchers are installed in devices by the original equipment manufacturer, possibly as a component of a mobile device operating system. In some mobile communication devices (e.g., an unlocked smart phone) a user can replace application launchers.

A subscriber identity module (SIM) card is a physical component, for example a smart card. A SIM card comprises a logic processor of modest power and a memory of modest capacity. The memory of the SIM card stores various information and credentials that may be accessed and used by the mobile communication device to authenticate into a radio access network (RAN) of a mobile communication service provider. Typically, a SIM card is issued to a subscriber by a mobile communication service provider at the time the subscriber opens a wireless communication service subscription account with the service provider. In some cases, a user may move his or her SIM card from a first mobile communication device to a second mobile communication device to use the second device with his or her wireless communication service account, for example to place voice calls and to access the Web. The SIM card may also store contacts information.

SUMMARY

In an embodiment, a method of activating a mobile communication device is disclosed. The method comprises powering on a mobile communication device having a subscriber identity module (SIM) card installed, the SIM card comprising a processor and a memory, wherein the memory stores, at least in part, an integrated circuit card identifier (ICCID), an international mobile subscriber identity (IMSI), an authentication key, and an operation object. The method further comprises, responsive to powering on the mobile communication device, booting the mobile communication device, wherein booting comprises reading at least a portion of the SIM card by a processor of the mobile communication device and executing the operation object by the processor of the mobile communication device and, responsive to executing the operation object, sending a request to download a custom application launcher by a Web browser client executed by the processor of the mobile communication device to a Web site identified by a uniform resource locator (URL) stored in the memory of the SIM card. The method further comprises receiving the custom application launcher from the Web site and installing the custom application launcher as the active application launcher on the mobile communication device. The method further comprises, responsive to installing the custom application launcher on the mobile communication device, sending a request to download a plurality of applications to a Web site by the custom application launcher, wherein at least two of the plurality of applications requested to download from the Web site are virtual pre-installation stub applications and receiving two or more of the requested applications on the mobile communication device. The method further comprises installing the received applications on the mobile communication device, wherein installing the virtual pre-installation stub applications on the mobile communication device comprises installing a widget on the display of the mobile communication device, wherein the widget comprises interactive thumbnail images of the applications associated with the virtual pre-installation stub applications, wherein the widget provides access to an application repository from which the applications associated with each virtual pre-installation stub application can be downloaded by selecting the associated thumbnail image.

In another embodiment, a subscriber identity module (SIM) card is disclosed. The SIM card comprises a processor, a memory, and an operation object. The memory stores, in part, the operation object, an integrated circuit card identifier (ICCID), an international mobile subscriber identity (IMSI), and an authentication key. When executed by the processor, the operation object causes a browser to be executed on a mobile communication device into which the SIM card is installed, provides a uniform resource locator (URL) to the browser, wherein the URL identifies a Web site, and causes the browser to send a request to the URL to download a custom application launcher and to install the custom application launcher on the mobile communication device.

In another embodiment, another method of activating a mobile communication device is disclosed. The method comprises powering on a mobile communication device having a subscriber identity module (SIM) card installed, the SIM card comprising a processor and a memory, wherein the memory stores, at least in part, an integrated circuit card identifier (ICCID), an international mobile subscriber identity (IMSI), an authentication key, and an operation object and responsive to powering on the mobile communication device, booting the mobile communication device, wherein booting comprises reading at least a portion of the SIM card by a processor of the mobile communication device and executing the operation object by the processor of the mobile communication device. The method further comprises, responsive to executing the operation object, sending a request to download a custom application launcher by a Web browser client executed by the processor of the mobile communication device to a Web site identified by a uniform resource locator (URL) stored in the memory of the SIM card. The method further comprises receiving the custom application launcher from the Web site, installing the custom application launcher as the active application launcher on the mobile communication device, executing the custom application launcher on the mobile communication device. The method further comprises sending a request to download customization items to a Web site by the custom application launcher, receiving the requested customization items by the mobile communication device, and customizing the mobile communication device based on the customization items. The customization items comprise at least three of a display wallpaper for the mobile communication device, a mobile communication service provider logo, a power-on video animation for the mobile communication device, a power-off video animation for the mobile communication device, a ringtone for the mobile communication device, a phone number or a short code of a customer care service associated with the mobile communication service provider, and a link to an applications store associated with the mobile communication service provider.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
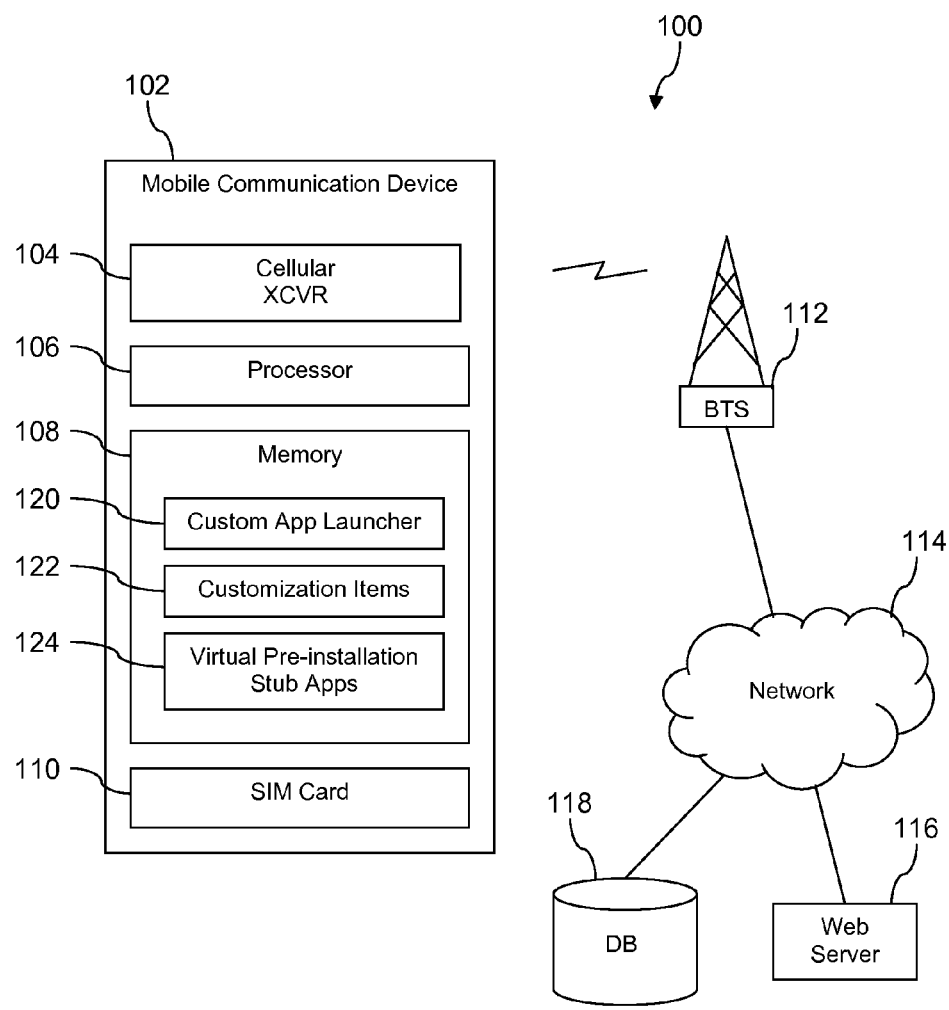
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In many countries outside the United States the wireless communication service subscriber buys his or her own mobile communication device (e.g., a mobile phone or a smart phone) without any device purchase subsidy provided by the wireless communication service provider. Because there is no device subsidy provided, typically the user is not under a long term wireless service contract. Under this business model, the user can readily change from a first service provider to a second service provider, for example by obtaining a subscriber identity module (SIM) card associated with the second service provider, installing the SIM card in his or her device, and booting the device (e.g., power cycling the device).

The present disclosure teaches a SIM card that stores an operation object or operational command that is executed by the mobile communication device the first time the device is powered on after installation of this SIM card. The operational command, when executed by a processor of the mobile communication device, reads a uniform resource locator (URL) stored in the SIM card, activates a Web browser of the device, and causes the Web browser to send a request to the stored URL. The URL identifies a Web application that downloads and installs a custom application launcher to the mobile communication device.

The custom application launcher, when activated upon initial installation, may perform additional actions that customize the mobile communication device for use with the second service provider. For example, in an embodiment, the custom application launcher reaches out to the second service provider's network (e.g., a content server or an application server), retrieves customization items, and installs the customization items on the mobile communication device. The customization items comprise one or more of a display wallpaper for the mobile communication device, a mobile communication service provider logo to present on the mobile communication device, a power-on video animation for the mobile communication device, a power-off video animation for the mobile communication device, a ringtone for the mobile communication device, one or more audible prompts (e.g., text message arrival audible prompt, email arrival audible prompt, etc.), a phone number or a short code of a customer care service associated with the mobile communication service provider, and a link to an applications store associated with the mobile communication service provider. At least some of the customization items may be considered branding items or branding artifacts associated with the brand of the second service provider.

The custom application launcher may comprise a monitoring and reporting function that tracks interactions of the user of the mobile communication device with the icons and widgets presented on the display of the mobile communication device. The monitoring and reporting function may further track user downloads of applications to the mobile communication device. The monitoring and reporting function may collect and summarize user interactions in a periodic report that is transmitted to the service provider for storage and analysis. The report may be used to charge application providers. The report may be used to derive profile information about the user to better serve the user's needs, for example to recommend applications for installation that may be consistent with the user's interests based on the profile.

The custom application launcher may further reach out to the second service provider's network, retrieve a plurality of virtual pre-installation stub applications, and install the virtual pre-installation stub applications on the mobile communication device. In an embodiment, virtual pre-installation stub applications behave similarly to applications that have been pre-installed by an original equipment manufacturer (OEM), but the corresponding applications are not initially fully installed on the device. In some contexts, this retrieval and installation of a virtual pre-installation stub application on the device may be referred to as virtually pre-installing the fully functional application.

The display may present an icon or thumbnail image representing the application, but the full application is not initially installed. When the user selects the icon or thumbnail image representing the application, a virtual pre-installation stub application is invoked by the custom application launcher, the virtual pre-installation stub application and/or the custom application launcher downloads the full application from the second service provider's network, the virtual pre-installation stub application and/or the custom application launcher installs the full application on the device, and then the custom application launcher launches and/or causes the fully functional application to execute.

In the domain of software development, test stubs are sometimes used to exercise the interface of a software module that is under development, for example when the full environment in which the software module will execute is not available. Said in other words, a test stub may be software that simulates the behavior of software that a software module under test depends upon or interacts with. The test stubs typically are not actually functioning applications (e.g., applications that function as the environment will function when it is deployed in a production phase of a system) but simply act as vehicles for sending and/or receiving more or less well formed interface or API messages. Test stubs are not typically executed by production systems when they are in service. Often test stubs are not part of deployed production software systems but are artifacts that are only used in development and/or laboratory situations. As used herein, the virtual pre-installation stub applications are distinct from test stubs. Here, the virtual pre-installation stub applications are part of the production system and perform useful functions in setting up and enabling the full functionality of associated applications.

Virtually pre-installing applications in the way described above may avoid application bloat in memories of mobile communication devices when many of the virtually pre-installed applications may never be used. For further details about virtual pre-installed applications and virtual pre-installation stub applications, see U.S. patent application Ser. No. 13/940,251, filed Jul. 11, 2013, entitled "Virtual Pre-Installation of Applications," by Fared A. Adib, et al., and U.S. patent application Ser. No. 13/940,253, filed Jul. 11, 2013, entitled "Dynamic Updating and Renaming Virtual Pre-Installation Stub Applications," by Fared A. Adib, et al., both of which are incorporated herein by reference in their entireties.

The custom application launcher may manage placement of icons and widgets on the home screen and/or other display screens. In an embodiment, the custom application launcher may reserve a space and/or specific location on the home screen or another screen for virtual pre-installation stub applications. For example, the custom application launcher may reserve a prominent or preferred location on the home screen by way of inducing the user to interact with the virtual pre-installation stub applications or to select the virtual pre-installation stub applications. In an embodiment, the custom application launcher may retrieve commands or indications of where to locate applications on the home screen or other screens from a Web service. The Web service may provide the graphical representations of applications and virtual pre-installation stub applications.

The custom application launcher may receive messages directed to it from the second service provider's network to download and install additional virtual pre-installation stub applications. The additional virtual pre-installation stub applications may replace earlier installed virtual pre-installation stub applications that have not been accessed. The messages to the custom application launcher may be IP notification messages, text messages, or another message format. The second service provider may desire replacement of unused virtual pre-installation stub applications because of changed business agreements with third party providers of applications (e.g., applications that have been virtually pre-installed or that may be in the future virtually pre-installed on the device). The second service provider may desire replacement of unused virtual pre-installation stub applications to maintain or rekindle a user's excitement with the mobile communication device and/or with the services of the second service provider (e.g., to distinguish over other competing service providers). The second service provider may be able to sell or auction virtual pre-installation stub application space or real-estate to third party application providers.

While the use scenario for the SIM card and the custom application launcher described above relate to a second wireless communication service provider, it is understood that the SIM card and the custom application launcher can function in the same way when the SIM card is associated with a first wireless communication service provider, for example the service provider that first provisions wireless communication service for a smart phone upon initial purchase of the smart phone as a new device. The custom application launcher provides a robust tool for customizing a mobile communication device at different times and/or phases of the service life of the device. This tool can be used by a service provider to retrofit its branding into a legacy mobile communication device (e.g., a device that was previously provisioned to receive wireless service via a different service provider). The tool can be used by a service provider to brand a new mobile communication device that was not previously provisioned to provide wireless service to a service subscriber or end user. The tool can be used to update branding and other custom features of the device throughout the service life of the device.

Turning now to FIG. 1A, a system 100 is described. In an embodiment, system 100 comprises a mobile communication device 102 or user equipment (UE), a base transceiver station (BTS) 112 or enhanced node B (eNB), a network 114, a Web server 116, and a data store 118. The device 102 may be a mobile phone, a smart phone, a personal digital assistant, a media player, a headset computer, or a wearable computer. When activated and provisioned for service, the device 102 may establish a communication link via the network 114 to other devices such as other mobile communication devices, Web content servers, application servers, and other terminals. The device 102 may establish a wireless communication link with the BTS 112, and the BTS 112 may provide the device 102 communication coupling to the network 114. The network 114 comprises one or more public communication networks, one or more private communication networks, or a combination thereof.

The mobile communication device 102 comprises a cellular radio transceiver 104 that is able to communicate wirelessly with the BTS 112 according to one or more of a code division multiple access (CDMA) protocol, a global system for mobile communication (GSM) protocol, a long term evolution (LTE) protocol, a worldwide interoperability for microwave access (WiMAX) protocol, or another wireless telecommunications protocol. In an embodiment, the device 102 further comprises a processor 106, a memory 108, and a removable subscriber identity module (SIM) card 110. In some embodiments, a different removable identity electronic card may be used and is consistent with the teachings of the present disclosure. For example, a universal integrated circuit card (UICC) or a removable user identity module (R-UIM) may be used in the place of a SIM card. It is understood that a SIM card 110 (or other removable electronic identity card or identity module) comprises both memory and logic processing functionality. When the mobile communication device 102 has been activated and provisioned as taught herein, the memory 108 may store a custom application launcher 120, one or more customization items 122, and virtual pre-installation stub applications 124.

Figure 1B:
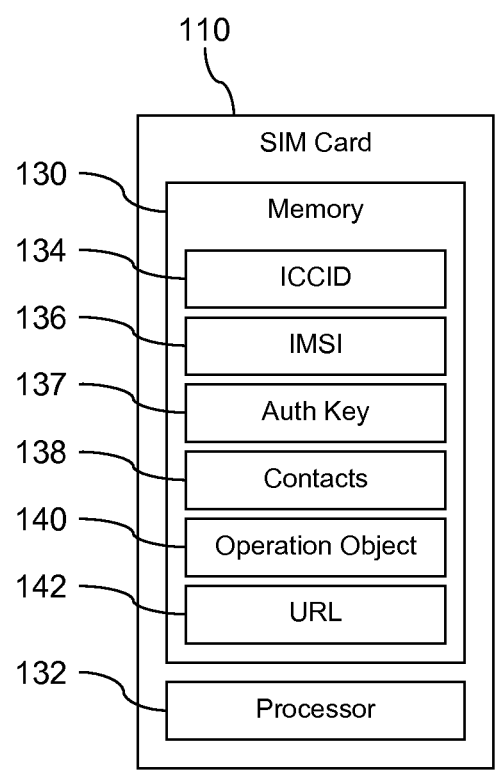
FIG. 1B is a block diagram of a subscriber identity module (SIM) card according to an embodiment of the disclosure.

Turning now to FIG. 1B, details of an embodiment of the SIM card 110 are described. The SIM card 110 comprises a memory 130 and a logic processor 132. In some contexts, the SIM card 110 or alternative removable electronic identity module may be referred to as a smart card. The memory 130 may store various identifying information and authentication information, for example information identifying the SIM card 110, identifying the subscriber, and/or identifying a mobile communication service provider and/or mobile communication network associated with the SIM card 110. The memory 130 may comprise a phone number. In an embodiment, the memory 130 may comprise an integrated circuit card identifier (ICCID) 134, an international mobile subscriber identity (IMSI) 136, and an authentication key 137. The IMSI may comprise a mobile country code (MCC), a mobile network code (MNC), and a mobile subscriber identification number (MSIN). The MNC identifies a mobile communication network. The memory 130 may alternatively or additionally comprise other information. The memory 130 may further comprise contacts 138, for example phone numbers and other contact information.

The memory 130 further comprises an operation object 140 and a uniform resource locator (URL) 142. The operation object 140 and the URL 142 are stored in the SIM card 110 before it is provided to an end user, for example before it is sold to a user who desires to subscribe to receive wireless communication services using the mobile communication device 102 into which the SIM card 110 may be installed.

When the mobile communication device 102 is first booted (e.g., power cycled) after insertion of the SIM card 110 into the device 102, the processor 106 of the mobile communication device 102 reads information from the memory 130 of the SIM card 110. The processor 106 reads the operation object 140 which comprises one or more executable instructions. In an embodiment, the operation object 140 may be an Android intent. The operation object 140 may be implemented as a Java applet. The processor 106 executes the operation object 140, and the operation object 140 commands the processor 106 to read the URL 142 from the memory 130 of the SIM card 110, to send a message via a Web browser of the mobile communication device 102 over a wireless link to the BTS 112, over the network 114, to a server and/or service identified by the URL 142, for example to the Web server 116. In an embodiment, utilities and/or functionalities provided by a SIM application toolkit (STK) may be employed to promote communications between the SIM card 110 and the device 102.

The message sent to the URL 142 is processed as a request or command by the Web server 116. The Web server 116 obtains a custom application launcher from the data store 118 and sends this to the mobile communication device 102, and the processor 106 installs this as the custom application launcher 120 in the memory 108 of the mobile communication device 102. In embodiment, the custom application launcher 120 may be a custom Android application launcher. In other embodiments, however, the custom application launcher 120 may instead by configured for use with operating systems other than Android. As is known to those of skill in the art, application launchers typically present the main display view of a mobile communication device (e.g., the presentation of controls and icons on the color graphics display of a smart phone) and is responsible for starting applications and hosting live widgets. The custom application launcher 120 of the present disclosure performs these standard functions as well as additional custom features related to enabling the mobile communication service provider associated with the SIM card 110 to customize and/or brand the mobile communication device 102.

In an embodiment, when the Web browser sends the message to the URL, content is downloaded from the Web server 116 and a welcome page based on the content is displayed on the device 102. The welcome page explains how the user may activate their phone including selecting to install the custom application launcher 120 and to select it as a default home application for the mobile communication device 102.

After being installed in the memory 108, the custom application launcher 120 may download and install a variety of customization items 122 from the data store 118. The custom application launcher 120 may work through the Web server 116 or an application server (not shown) to obtain and install the customization items 122. The customization items may comprise one or more of a display wallpaper for the mobile communication device 102, a mobile communication service provider logo to present on the mobile communication device 102, a power-on video animation for the mobile communication device 102, a power-off video animation for the mobile communication device 102, a ringtone for the mobile communication device 102, one or more audible prompts (e.g., text message arrival audible prompt, email arrival audible prompt, etc.), a phone number or a short code of a customer care service associated with the mobile communication service provider, and a link to an applications store associated with the mobile communication service provider. In an embodiment, the custom application launcher 120 may download and install at least three customization items 122. In an embodiment, customizing the mobile communication device 102 comprises replacing or deactivating one or more of a display wallpaper, a service provider logo, aural alert tones, a power-on video animation, a power-off video animation, a ringtone, a phone number of short code of a customer care service, or a link to an applications store previously installed on the device 102. These previously installed artifacts may be referred to in some contexts as pre-customization items.

The custom application launcher 120, in an embodiment, further downloads and installs one or more virtual pre-installation stub applications 124. As discussed above, virtual pre-installation stub applications do not themselves provide the functionality of the applications with which they are associated. The virtual pre-installation stub application 124, when selected by a user (e.g., when a user touches the icon or thumbnail image of the associated application on a touch screen display of the device 102), reaches out to a data store and/or application store to download and installs the application that does provide the associated application functionality. The virtual pre-installation stub applications 124 are referred to as virtual pre-installation stub applications or as being virtually pre-installed, because their behavior mimics, with some restrictions, the behavior of applications that are pre-installed on the device 102 by an original equipment manufacturer (OEM). The mimicking or simulating motivates the use of the term "virtual" in this context.

Installing the virtual pre-installation stub applications 124 may comprise installing a widget on the display of the mobile communication device 102, wherein the widget comprises interactive thumbnail images of the applications associated with the virtual pre-installation stub applications. The widget provides access to an application repository (the data store 118, an application store, or another data store) from which the applications associated with each virtual pre-installation stub application can be downloaded by the widget or under widget mediation when a user selects the associated thumbnail image.

At a later period in time, for example months after initial booting of the device 102 with the SIM card 110 installed and after downloading and installing an initial one or more virtual pre-installation stub applications, the service provider (e.g., a server computer operated by the service provider) may command the custom application launcher 120 to replace one or more virtual pre-installation stub applications 124 with different virtual pre-installation stub applications 124 downloaded from a data store or application store in the service provider network. In an embodiment, a widget mediating the access to the virtual pre-installation stub applications 124 may be commanded by the server to delete previously installed virtual pre-installation stub applications 124 and remove the associated thumbnail image and replace it with a thumbnail image associated with one of the new virtual pre-installation stub applications 124. The service provider may likewise send a command to the custom application launcher 120, at a time after initial activation of the device 102 with the SIM card 110 installed, to download and install one or more replacement customization items 122. For example, the service provider may update one or more of the customization items 122 that were downloaded and installed earlier.

Figure 2A:
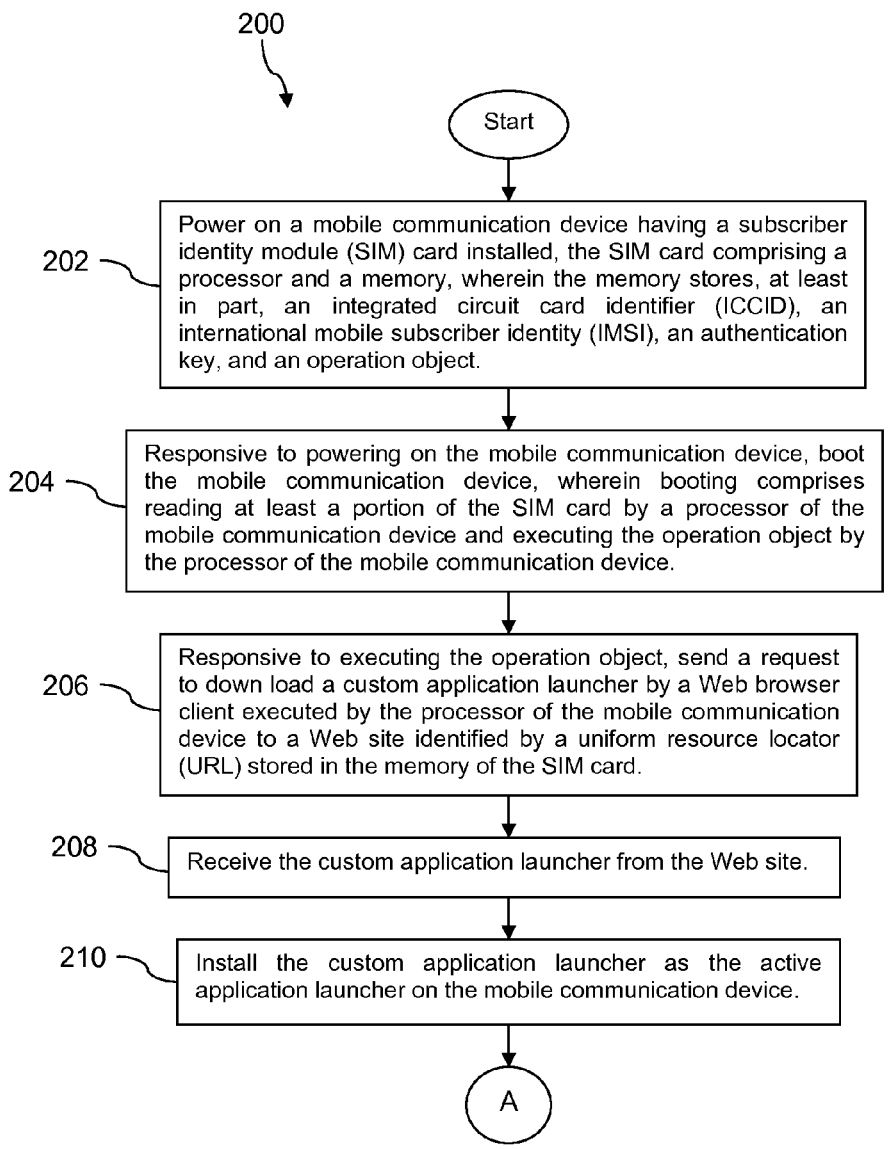
FIG. 2A and FIG. 2B are a flow chart of a method according to an embodiment of the disclosure.
Figure 2B:
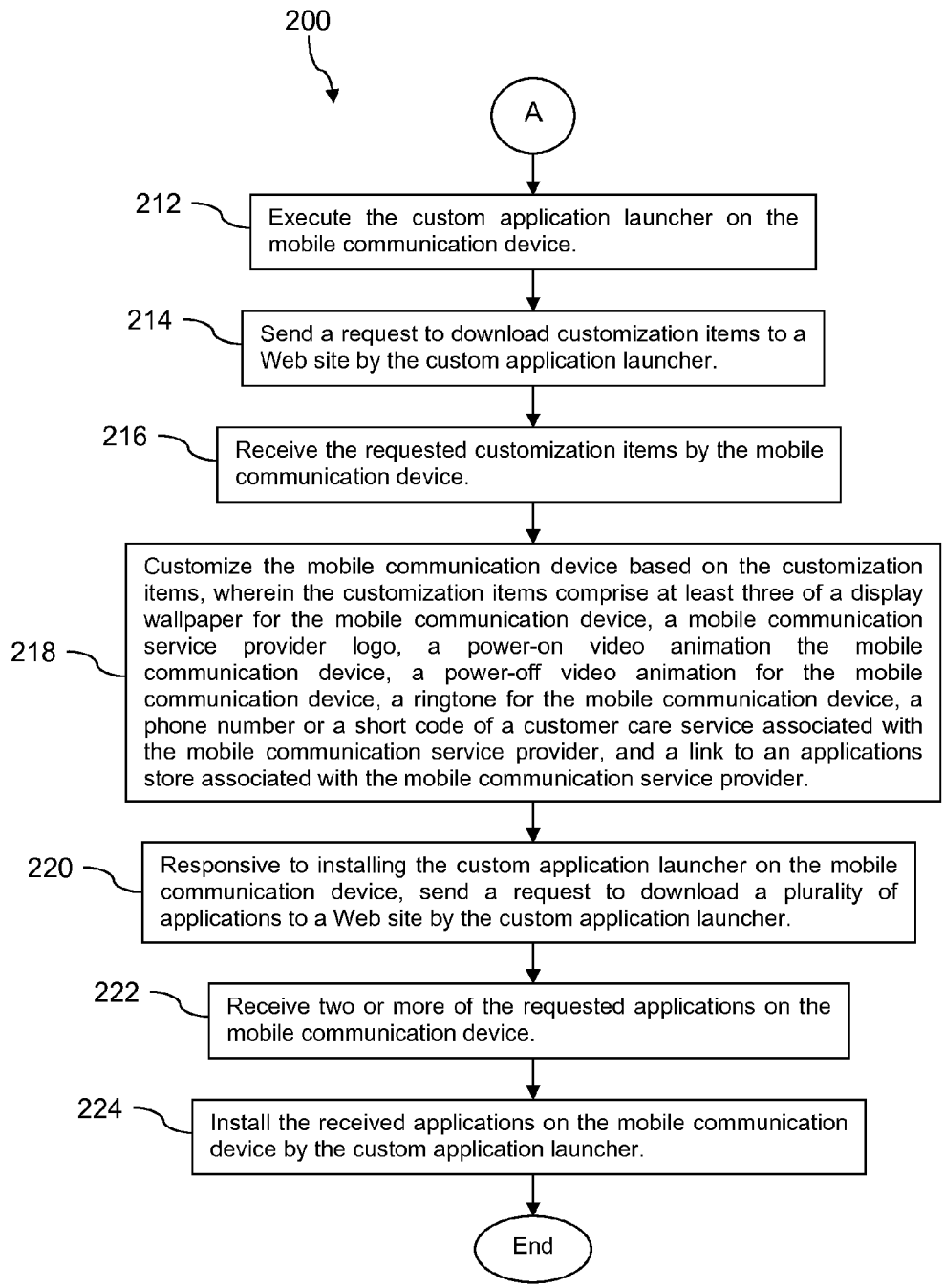

Turning now to FIG. 2A and FIG. 2B, a method 200 is described. At block 202, power on a mobile communication device having a subscriber identity module (SIM) card installed, the SIM card comprising a processor and a memory, wherein the memory stores, at least in part, an integrated circuit card identifier (ICCID), an international mobile subscriber identity (IMSI), an authentication key, and an operation object. At block 204, responsive to powering on the mobile communication device, boot the mobile communication device, wherein booting comprises reading at least a portion of the SIM card by a processor of the mobile communication device and executing the operation object by the processor of the mobile communication device. It is understood that when a mobile communication device is powered off and later powered on, part of the power-on cycle comprises booting. As is understood by those of skill in the art, booting or booting up is a process that initializes a computer system (in this case, the mobile communication device 102 can be abstracted as a computer system or a computing device) and starts the runtime processes of the system.

At block 206, responsive to executing the operation object, send a request to download a custom application launcher by a Web browser client executed by the processor of the mobile communication device to a Web site identified by a uniform resource locator (URL) stored in the memory of the SIM card. At block 208, receive the custom application launcher from the Web site. At block 210, install the custom application launcher as the active application launcher on the mobile communication device.

At block 212, execute the custom application launcher on the mobile communication device. At block 214, send a request to download customization items to a Web site by the custom application launcher. At block 216, receive the requested customization items by the mobile communication device.

At block 218, customize the mobile communication device based on the customization items, wherein the customization items comprise at least three of a display wallpaper for the mobile communication device, a mobile communication service provider logo, a power-on video animation the mobile communication device, a power-off video animation for the mobile communication device, a ringtone for the mobile communication device, a phone number or a short code of a customer care service associated with the mobile communication service provider, and a link to an applications store associated with the mobile communication service provider. It is understood that the processing of blocks 214, 216, and 218 are optional and may not be performed in some embodiments.

At block 220, responsive to installing the custom application launcher on the mobile communication device, send a request to download a plurality of applications to a Web site by the custom application launcher. In an embodiment, the plurality of applications may comprise two or more virtual pre-installation stub applications 124. At block 222, receive two or more of the requested applications on the mobile communication device. The received applications may comprise two or more virtual pre-installation stub applications 124. At block 224, install the received applications on the mobile communication device by the custom application launcher 120. The custom application launcher 120 may install two or more virtual pre-installation stub applications 124 during the processing of block 224.

Figure 3:
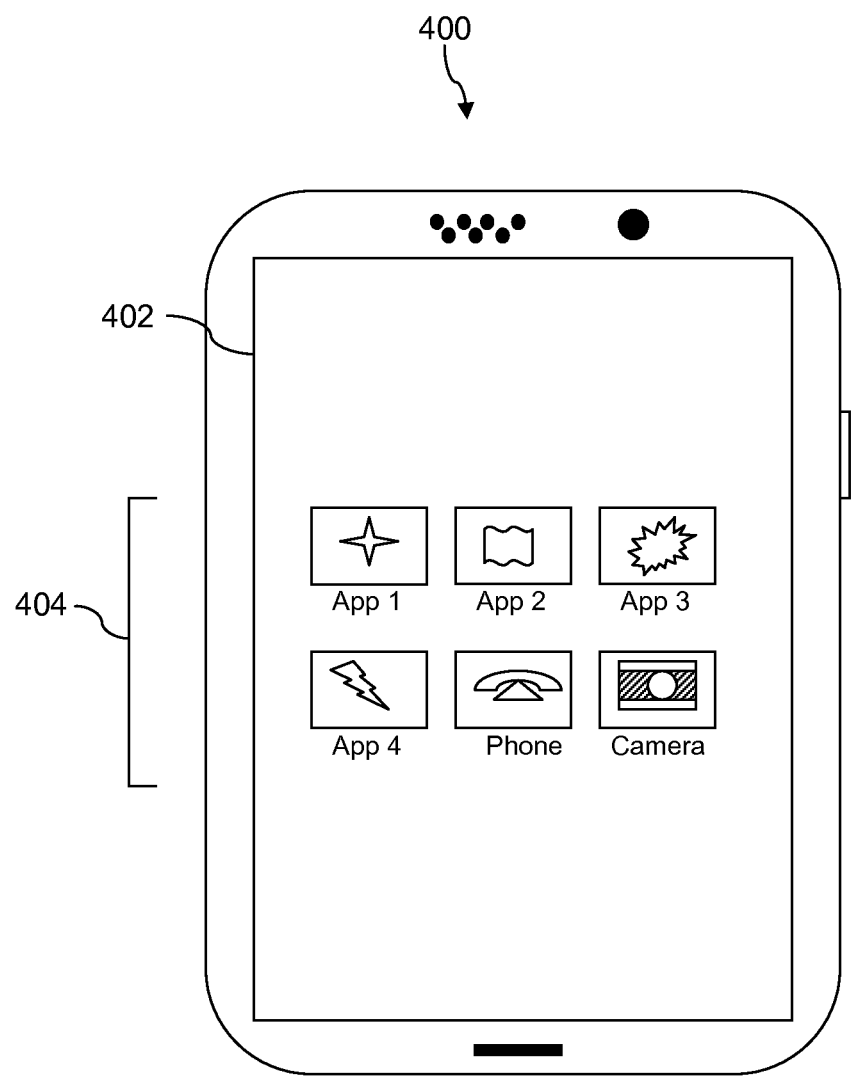
FIG. 3 is an illustration of a handset according to an embodiment of the disclosure.

FIG. 3 depicts a mobile communication device 400 or UE, which is operable for implementing aspects of the present disclosure, but the present disclosure should not be limited to these implementations. Though illustrated as a mobile phone, the mobile communication device 400 may take various forms including a wireless handset, a pager, a personal digital assistant (PDA), a gaming device, or a media player. The mobile communication device 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the mobile communication device 400, a user may be able to download and install additional applications on the mobile communication device 400, and an icon associated with such downloaded and installed applications may be added to the touch screen display 402 or to an alternative screen.

The mobile communication device 400 may have other components such as electro-mechanical switches, speakers, camera lenses, microphones, input and/or output connectors, and other components as are well-known in the art. The mobile communication device 400 may present options for the user to select, controls for the user to actuate, and/or cursors or other indicators for the user to direct. The mobile communication device 400 may further accept data entry from the user, including numbers to dial or various parameter values for configuring the operation of the handset. The mobile communication device 400 may further execute one or more software or firmware applications in response to user commands. These applications may configure the mobile communication device 400 to perform various customized functions in response to user interaction. Additionally, the mobile communication device 400 may be programmed and/or configured over-the-air, for example from a wireless base station, a wireless access point, or a peer mobile communication device 400. The mobile communication device 400 may execute a web browser application which enables the touch screen display 402 to show a web page. The web page may be obtained via wireless communications with a base transceiver station, a wireless network access node, a peer mobile communication device 400 or any other wireless communication network or system.

Figure 4:
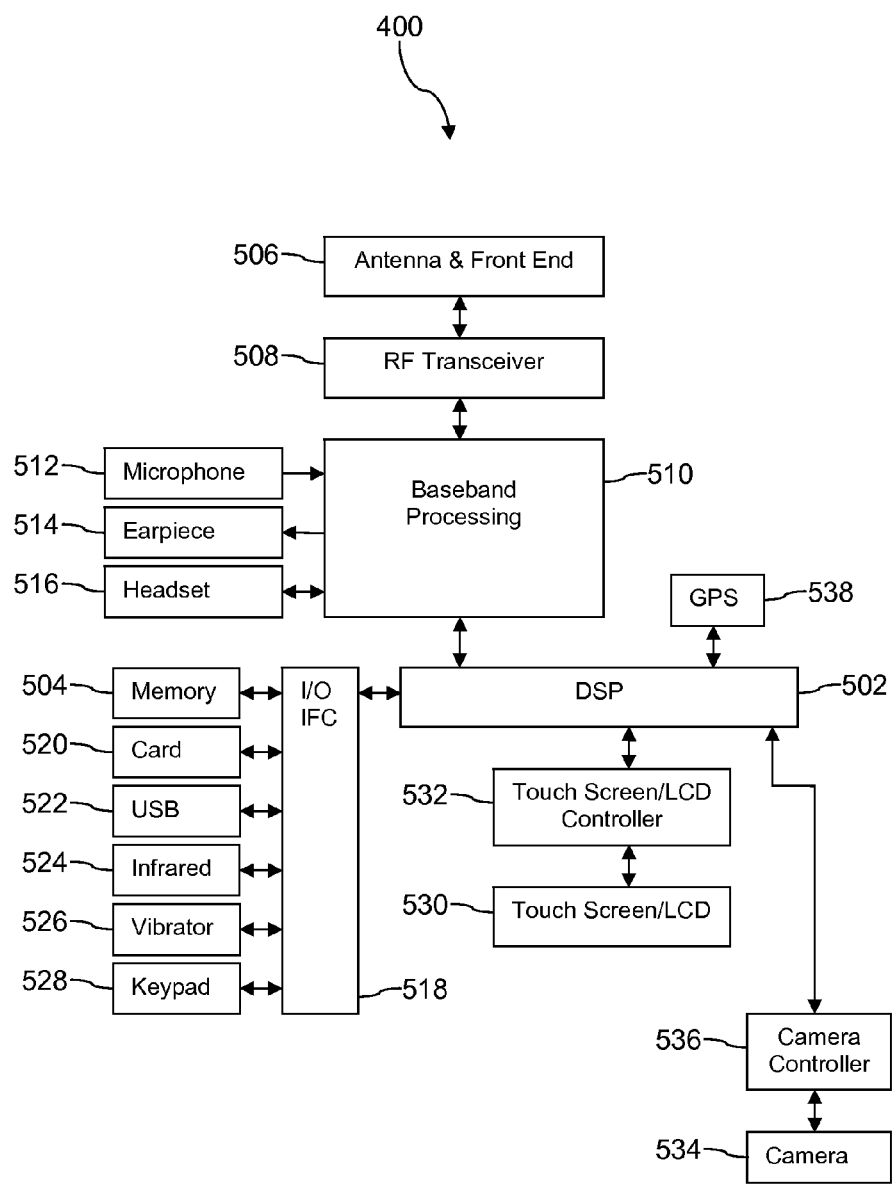
FIG. 4 is a block diagram of a hardware architecture of a mobile communication device according to an embodiment of the disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
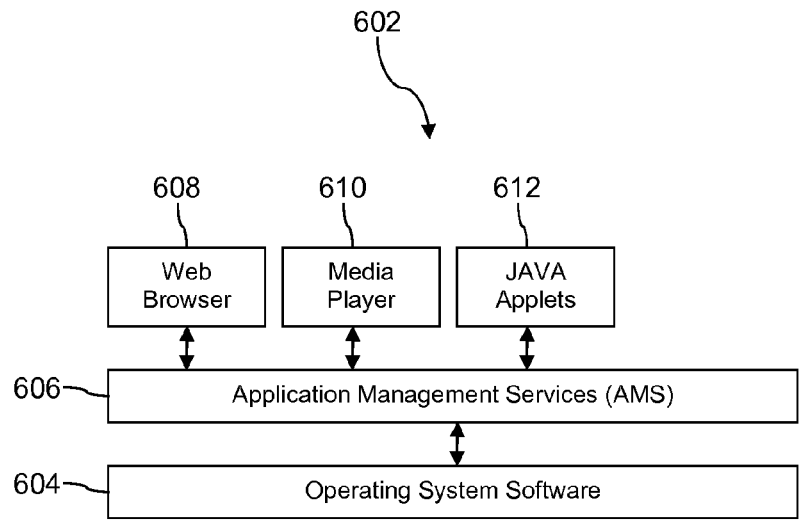
FIG. 5A is a block diagram of a software architecture of a mobile communication device according to an embodiment of the disclosure.
Figure 5B:
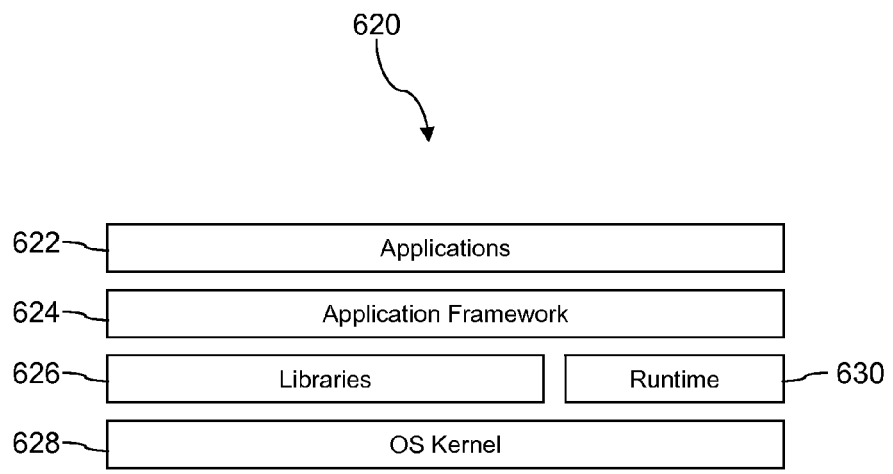
FIG. 5B is a block diagram of another software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a Web browser application 608, a media player application 610, and JAVA applets 612. The Web browser application 608 may be executed by the mobile device 400 to browse content and/or the Internet, for example when the mobile device 400 is coupled to a network via a wireless link. The Web browser application 608 may permit a user to enter information into forms and select links to retrieve and view Web pages. The media player application 610 may be executed by the mobile device 400 to play audio or audiovisual media. The JAVA applets 612 may be executed by the mobile device 400 to provide a variety of functionality including games, utilities, and other functionality.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
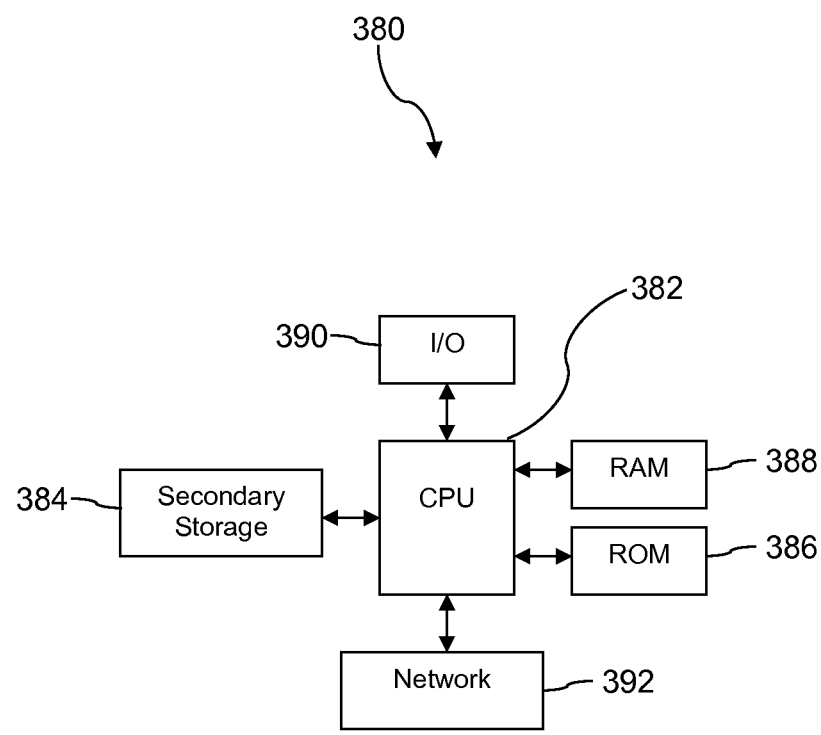
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of activating a mobile communication device, comprising:
   powering on a mobile communication device having a subscriber identity module (SIM) card installed, the SIM card comprising a processor and a memory, wherein the memory stores, at least in part, an integrated circuit card identifier (ICCID), an international mobile subscriber identity (IMSI), an authentication key, and an operation object;
   responsive to powering on the mobile communication device, booting the mobile communication device, wherein booting comprises reading at least a portion of the SIM card by a processor of the mobile communication device and executing the operation object by the processor of the mobile communication device;
   responsive to executing the operation object, sending a request to download a custom application launcher by a Web browser client executed by the processor of the mobile communication device to a Web site identified by a uniform resource locator (URL) stored in the memory of the SIM card;
   receiving the custom application launcher from the Web site;
   installing the custom application launcher as the active application launcher on the mobile communication device;
   executing the custom application launcher on the mobile communication device;
   sending a request to download customization items to a Web site by the custom application launcher;
   receiving the requested customization items by the mobile communication device; and
   customizing the mobile communication device based on the customization items, wherein the customization items comprise at least three of a display wallpaper for the mobile communication device, a mobile communication service provider logo, a power-on video animation for the mobile communication device, a power-off video animation for the mobile communication device, a ringtone for the mobile communication device, a phone number or a short code of a customer care service associated with the mobile communication service provider, and a link to an applications store associated with the mobile communication service provider.

2. The method of claim 1, wherein customizing the mobile communication device comprises replacing or deactivating one or more pre-customization items, wherein the pre-customization items comprise one or more of a display wallpaper, a logo of a previous mobile communication service provider, a power-on video animation, a power-off video animation, a ringtone, a phone number or a short code of a customer care service associated with the previous mobile communication service provider, and a link to an applications store associated with the previous mobile communication service provider, where the pre-customization items were installed on the mobile communication device before the custom application launcher was installed on the mobile communication device.

3. The method of claim 1, wherein the mobile communication device is one of a mobile phone, a personal digital assistant, and a media player.

4. The method of claim 1, wherein the mobile communication device is a smart phone.

5. The method of claim 1, wherein the mobile communication device is an Android smart phone.

6. The method of claim 5, wherein the operation object is an Android intent.

7. A method of activating a mobile communication device, comprising:
   powering on a mobile communication device having a subscriber identity module (SIM) card installed, the SIM card comprising a processor and a memory, wherein the memory stores, at least in part, an integrated circuit card identifier (ICCID), an international mobile subscriber identity (IMSI), an authentication key, and an operation object;
   responsive to powering on the mobile communication device, booting the mobile communication device, wherein booting comprises reading at least a portion of the SIM card by a processor of the mobile communication device and executing the operation object by the processor of the mobile communication device;

responsive to executing the operation object, sending a request to download a custom application launcher by a Web browser client executed by the processor of the mobile communication device to a Web site identified by a uniform resource locator (URL) stored in the memory of the SIM card;

receiving the custom application launcher from the Web site;

installing the custom application launcher as the active application launcher on the mobile communication device;

responsive to installing the custom application launcher on the mobile communication device, sending a request to download a plurality of applications to a Web site by the custom application launcher, wherein at least two of the plurality of applications requested to download from the Web site are virtual pre-installation stub applications;

receiving two or more of the requested applications on the mobile communication device; and installing the received applications on the mobile communication device, wherein installing the virtual pre-installation stub applications on the mobile communication device comprises installing a widget on the display of the mobile communication device, wherein the widget comprises interactive thumbnail images of the applications associated with the virtual pre-installation stub applications, wherein the widget provides access to an application repository from which the applications associated with each virtual pre-installation stub application can be downloaded by selecting the associated thumbnail image.

8. The method of claim 7, further comprising receiving by the custom launcher application a command from a server in a communication network identified by the IMSI;

responsive to receiving the command, the custom launcher application downloading at least one additional virtual pre-installed stub application;

removing at least one of the thumbnail images of applications from the widget; and replacing the removed thumbnail image with a thumbnail image representing an application associated with the at least one additional virtual pre-installation stub application.

9. The method of claim 7, wherein the mobile communication device is one of a mobile phone, a personal digital assistant (PDA), or a media player.

10. The method of claim 7, wherein the operation object is an Android intent.

11. The method of claim 10, wherein the custom application launcher is a custom Android application launcher.

12. The method of claim 7, wherein the custom application launcher further causes the Web browser client to download customization artifacts and causes the customization artifacts to be installed on the mobile communication device.

13. The method of claim 7, wherein sending the request to download the custom application launcher by the Web browser client is transmitted wirelessly by the mobile communication device according to at least one of a long term evolution (LTE), a code division multiple access (CDMA), a global system for mobile communications (GSM), or a worldwide interoperability for microwave communications (WiMAX) wireless telecommunications protocol.

14. A subscriber identity module (SIM) card, comprising:
a processor;
a memory, the memory storing, in part, an integrated circuit card identifier (ICCID), an international mobile subscriber identity (IMSI), an authentication key; and
an operation object stored in the memory that, when executed by the processor
causes a browser to be executed on a mobile communication device into which the SIM card is installed,
provides a uniform resource locator (URL) to the browser, wherein the URL identifies a Web site, and
causes the browser to send a request to the URL to download a custom application launcher and to install the custom application launcher on the mobile communication device, wherein the custom application launcher, when executed by the mobile communication device, causes:
the browser to download a plurality of virtual pre-installation stub applications from the Web site identified by the URL,
the virtual pre-installation stub applications to be at least partially installed on the mobile communication device,
the browser to download customization artifacts, and
the customization artifacts to be installed on the mobile communication device.

15. The SIM card of claim 14, wherein the operation object comprises an Android intent.

16. The SIM card of claim 15, wherein the custom application launcher comprises a custom Android launcher.

17. The SIM card of claim 14, wherein the customization artifacts comprise a mobile communication device display wallpaper.

18. The SIM card of claim 14, wherein the customization artifacts comprise a wireless communication service provider logo, wherein the wireless communication service provider is associated with the communication network identified by the IMSI.

* * * * *